United States Patent [19]

Kato et al.

[11] 4,302,672

[45] Nov. 24, 1981

[54] IMAGE GRADATION PROCESSING METHOD AND APPARATUS FOR RADIATION IMAGE RECORDING SYSTEM

[75] Inventors: Hisatoyo Kato; Masamitsu Ishida; Seiji Matsumoto, all of Minami-ashigara, Japan

[73] Assignee: Fuji Photo Film Co., Ltd., Kanagawa, Japan

[21] Appl. No.: 123,578

[22] Filed: Feb. 22, 1980

[30] Foreign Application Priority Data

Feb. 28, 1979 [JP] Japan .................................. 54-23091

[51] Int. Cl.$^3$ .......................... G03C 5/16; G01T 1/11; G06F 15/42
[52] U.S. Cl. ................................ 250/327.1; 250/337; 364/414; 364/515
[58] Field of Search ..................... 250/320, 337, 327.1, 250/416 TV, 322, 323; 358/111; 364/414, 515

[56] References Cited

U.S. PATENT DOCUMENTS 3,975,637  8/1976  Ikedo et al. ...................... 250/327.1
4,149,076  4/1979  Albert ........................... 250/416 TV Primary Examiner—Alfred E. Smith
Assistant Examiner—Carolyn E. Fields
Attorney, Agent, or Firm—Gerald J. Ferguson, Jr.; Joseph J. Baker

[57] ABSTRACT

A method and apparatus for processing a radiation image in a radiation image recording system in which a stimulable phosphor is stimulated with a scanning stimulating ray and the light emitted from the stimulable phosphor upon stimulation by the stimulating ray is detected by a photodetector which gives an output to be processed and used for recording a visible image on a recording medium. The radiation image of the frontal chest is gradation processed. The gradation processing is characterized in that the density between the densities of the spine and the heart of the image on the recording medium is lowered to lower the contrast of the spine and raise the contrast of the heart and the lungs.

13 Claims, 9 Drawing Figures

IMAGE GRADATION PROCESSING METHOD AND APPARATUS FOR RADIATION IMAGE RECORDING SYSTEM

BACKGROUND OF THE INVENTION

1. Field of the Invention

This invention relates to a method of processing a radiation image in a radiation image recording system used for medical diagnosis and apparatus therefor. This invention particularly relates to an image gradation processing method and apparatus in a radiation image recording system in which a stimulable phosphor is used for recording radiation image information as an intermediate recording medium and the image recorded therein is read out for reproduction and finally recorded on a recording medium.

2. Description of the Prior Art

For medical diagnosis, there are generally used X-ray films for taking radiographs. Since the X-rays do harm to the human body, it is impossible from the viewpoint of safety to expose the human body to X-rays of high dose. Therefore, it is desired that the necessary information in the radiograph can be obtained by exposing the human body only once to the X-ray of comparatively low dose. On the other hand, radiographs should preferably have both a wide exposure latitude and high image quality of high contrast, high sharpness, low noise etc. for viewing and diagnosis purposes. Unfortunately, since the conventional radiography is designed so as to satisfy all the required conditions to some extent, the range of recording density or the ability to record various levels of information and the image quality are both insufficient and neither of these properties are completely satisfied.

In view of the above circumstances, the inventors of this invention suggested in Japanese Pat. application No. 84741/1978 a radiation image recording system in which radiation image information is recorded in a stimulable phospher by exposing the phosphor to a radiation transmitting through an object like a human body, then the recorded information is read out by use of a photodetector by stimulating the phosphor with a stimulating ray like a laser beam or the like, and the read out information is recorded on a recording medium by modulating a recording laser beam or the like with the information read out by the photodetector.

This radiation image recording system is far more advantageous that the conventional radiography using a silver halide photographic film in that the image is recorded over a very wide dynamic range of radiation exposure. Therefore, this system is particularly valuable when it is applied to the radiographic diagnosis of the human body. By using this system for such purposes, it becomes possible to obtain the information which cannot be obtained in the conventional radiography because of the limited exposure range that can be recorded and observed on the conventional X-ray film.

Further, it was also made possible in the above method that the light emitted by the stimulable phosphor upon stimulation is converted to an electric signal and processed to improve the image quality for viewing and diagnosis purposes. In the above patent application, however, the concrete method for improving the image quality to enhance the diagnostic efficiency and accuracy is not definitely disclosed.

Then, the present inventors have conducted researches and investigations for enhancing the diagnostic efficiency and accuracy and further suggested in Japanese patent application No. 163571/1978 an unsharp masking process for emphasizing the super-low frequency component and in U.S. patent application No. 106,733 an image gradation processing method for modifying the gradation of a radiation image of the chest.

The present invention is related to the image gradation processing of a radiation image, particularly to the method of and apparatus for gradation processing a radiation image of the chest.

In the conventional chest radiography, an X-ray film is used for recording the X-ray transmission image of the chest and recorded image is observed with the naked eyes for diagnosis. In the chest radiography, there are recorded lungs, a heart and a spine. The spine has the lowest density since the transmittivity thereof to the X-rays is low. The heart has the second lowest density since the transmittivity thereof to the X-rays is comparatively low. The lungs have high density since the transmittivity thereof to the X-rays is high. Further, since the lungs have complex trachea/bronchus and blood vessels, the image of the lungs is very complicated. The part outside the substantial image of the human body has the upmost density since this part of the X-ray film is exposed to X-rays directly coming from the X-ray source.

As mentioned above, the chest radiography has various information of various parts of the human body which is recorded in the density having a wide range of levels. Sometimes, the density ranges from 0 to 3.5 in terms of optical density. Further, since the various parts are not recorded in the desirable contrast respectively, it is very difficult and necessary to have a great skill to make proper diagnosis from the radiograph in which the disease must be found out from a very slight variation in density in the image.

It is generally known in the art that the image properties can be changed by processing the image by use of an electronic signal or information processing method. For instance, even in radiography, it is possible to read the image recorded on the X-ray film by an optical scanning means and process the read out signal by a signal processing means to change the various image properties such as contrast and the density level and then record a visible image on a recording film or the like based on the processed signal.

In the radiography, however, the recorded image is used for the purpose of "diagnosis" and the diagnostic efficiency and accuracy (the level of easiness for diagnosis or adaptability to diagnosis) are not simply enhanced by simply making so-called "good" image from the point of the ordinary image quality factors such as sharpness, granularity and contrast. Rather than these factors, the diagnostic efficiency and accuracy are influenced by other complex factors such as reference with the normal shade, reference with the anatomical structure and utilization of other diagnostic view or records.

In view of the above circumstances, the present inventors further conducted researches and investigations as to the image gradation processing for enhancing the diagnostic efficiency and accuracy, and found that the diagnostic efficiency and accuracy was improved in the radiation image of the chest by lowering the level of the signal corresponding to the between the densities of the heart and the lungs of the radiation image to lower the contrast of the heart and thereby raising the contrast of the lungs. This method is disclosed in U.S. Pat. application No. 106,733.

According to this method, the diagnostic efficiency and accuracy of the radiation image of the chest was markedly enhanced. As a result of further researches and investigations, it has been discovered that the diagnostic efficiency and accuracy of the radiation image of the chest are further improved by lowering the level of the signal corresponding to the density between the densities of the spine and the heart.

SUMMARY OF THE INVENTION

The primary object of the present invention is to provide a method of and apparatus for gradation processing a radiation image of the chest.

Another object of the present invention is to provide a method of and apparatus for processing a radiation image in a radiation image recording system using a stimulable phosphor which is capable of obtaining a radiation image having high diagnostic efficiency and accuracy.

The method of and apparatus for processing the radiation image of the chest are characterized in that the density between the densities of the spine and the heart of the image on the recording material is lowered to lower the contrast of the spine and thereby raising the contrast of the heart and the lungs in the radiation image finally recorded on a recording medium.

Further, a modified method of and apparatus for processing the radiation image of the chest are characterized in that the density between the densities of the heart and the lungs is also lowered to lower the density of the heart as a whole. By thus lowering the density of the heart, the contrast of the spine is lowered and the contrast of the lungs is enhanced to improve the diagnostic efficiency and accuracy.

In accordance with the gradation processes as mentioned above, the density of the heart and the lungs is lowered and the contrast of the heart and the lungs or of only the lungs is raised, and consequently the image thus gradation processed is improved of its diagnostic efficiency and accuracy. It should be noted that, though the contrast of the spine is lowered, it does not affect the diagnostic efficiency and accuracy since this part is the brightest part and human eyes have high gradational response to such a part.

In general, most of the chest radiographs are made for the purpose of mainly observing the lungs. Therefore, in accordance with the present invention in which the contrast and the density of the lungs are particularly improved, the diagnostic efficiency and accuracy of the lungs are markedly enhanced without substantially lowering the diagnostic efficiency and accuracy of the spine and the heart.

The density between the densities of the spine and the heart means the density of the level between the level of the mean density of the spine and the level of the mean density of the heart of the radiation image. In other words, the density between the densities of the spine and the heart is higher than the density of the spine and lower than the density of the heart. Accordingly, by lowering said density, the contrast of the spine is lowered and the contrast of the lungs is raised.

The stimulable phosphor referred to in this invention means a phosphor which is able to store radiation energy upon exposure thereof to high energy radiations and then emits light according to the stored energy upon optical stimulation. The high energy radiations referred to here includes X-rays, gamma-rays, beta-rays, alpha-rays, neutron-rays, ultraviolet-rays and the like.

As for the stimulating rays for stimulating the phosphor after the phosphor is excited with the radiation energy in an image pattern, a light beam having high directivity like a laser beam is used. As the light beam, a light beam having a wavelength within the range of 500 to 800 nm, preferably of 600 to 700 nm is preferred. If a color filter which cuts the light having a wavelength beyond the above range is used together with a light source, a light source having a wavelength distribution beyond said range can be used.

As for the stimulating ray source which emits the light having the above mentioned wavelength region, a Kr-laser (647 nm), a He-Ne laser (633 nm), various kinds of light emitting diode, a rhodamine B dye laser and the like can be used. Further, a tungsten iodine lamp having a wide wavelength distribution covering near ultraviolet rays, visible light and infrared rays can be used if combined with a cut filter which only transmits light of the wavelength within the range of 500 to 800 nm or 600–700 nm.

Since the ratio of the stimulating energy and emitted light energy is generally $10^4:1$ to $10^6:1$, the S/N ratio would be markedly lowered if the stimulating ray should enter the photodetector. Therefore, in order to prevent the lowering of the S/N ratio, it is desirable to make the wavelength distribution of the stimulating ray different from and for apart from the wavelength distribution of the light emitted from the stimulable phosphor.

In order to meet this requirement, the stimulable phosphor is desired to emit light having a wavelength within the range of 300 to 500 nm. For example, rare earth activated alkaline earth metal fluorohalide phosphor is preferred. On example of this phosphor is, as shown in Japanese patent application No. 53(1978)–84742, a phosphor represented by the formula $(Ba_{1-x-y},Mg_x,Ca_y)FX:aEu^{2+}$ wherein X is at least one of Cl and Br, x and y are positive numbers which satisfy $0 < x+y \leq 0.6$ and $xy \neq 0$, and a is a number satisfying $10^{-6} \leq a \leq 5 \times 10^{-2}$. Another example of this phosphor is, as shown in Japanese patent application No. 53(1978)–84744, a phosphor represented by the formula $(Ba_{1-x},M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$. Further, as the stimulable phosphor to be used in this invention can be used ZnS:Cu,Pb; $BaO.xAl_2O_3$:Eu wherein $0.8 \leq x \leq 10$; $M^{II}O \cdot xSiO_2$:A wherein $M^{II}$ is Mg, Ca, Sr, Zn, Cd or Ba, A is Ce, Tb, Eu, Tm, Pb, Tl, Bi or Mn, and x is a number satisfying $0.5 \leq x \leq 2.5$, as shown in Japanese patent application No. 53(1978)–84740. Furthermore, as the stimulable phosphor can be used LnOX:xA wherein Ln is at least one of La, Y, Gd and Lu, X is at least one of Cl and Br, A is at least one of Ce and Tb, x is a number satisfying $0 < x < 0.1$, as shown in Japanese patent application No. 53(1978)–84743. Among the above numerated phosphors, the rare earth activated alkaline earth metal fluorohalide phosphor is the most preferable, among which barium fluorohalides are the most preferable in view of the high intensity of emission of light.

Further, it is desirable to color the phosphor layer of the stimulable phosphor plate made of the above phosphor by use of pigments or dyes to improve the sharpness of the image obtained thereby as disclosed in Japanese patent application No. 54(1979)-71604.

DESCRIPTION OF PREFERRED EMBODIMENTS

Now the present invention will be described in detail with reference to the drawings.

Figure 1:
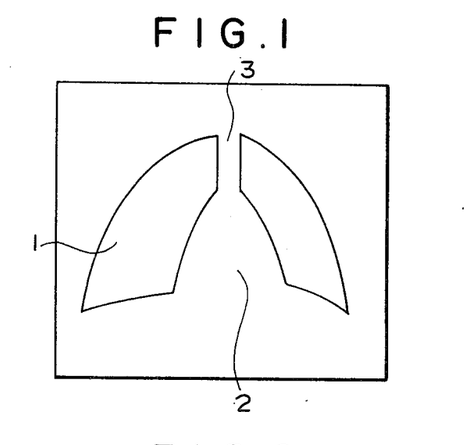
FIG. 1 is a schematic view of a radiation image of the chest to be processed in accordance with the present invention.

Referring to FIG. 1, a frontal chest radiograph has images of lungs 1, heart 2 and spine 3. Since the conventional radiation image of the chest does not have desirable density and contrast, the accurate diagnosis is not easy from the radiograph as it is. In accordance with the present invention, therefore, the X-ray image information is read out from the image recorded in the stimulable phosphor (hereinafter referred to as "original image") and the read out information is processed by a signal conversion system for varying the gradation when the image is finally recorded on a recording medium like a photographic film.

Figure 2:
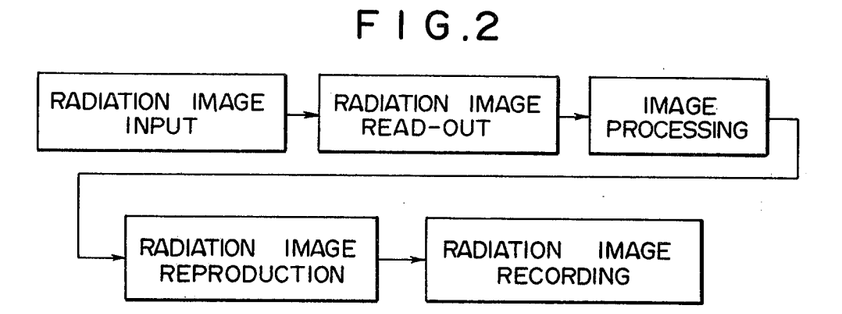
FIG. 2 is a flow chart which shows the steps of the method of processing a radiation image of the chest in accordance with the present invention.

FIG. 2 shows the steps of the method of processing the radiation image in accordance with the present invention which is particularly applied to an X-ray image recording system. At first, a stimulable phosphor is exposed to X-rays transmitting through a human body. Thus, the X-ray image is input into the stimulable phosphor and memorized therein as radiation energy stored at its trap level.

Then, after the X-ray image input, the stimulable phosphor is stimulated with a scanning stimulating light beam having a wavelength within the range of 500 to 800, preferably 600 to 700 nm. Upon stimulation, the stimulable phosphor emits light having a wavelength within the range of 300 to 500 nm. The emitted light is detected by a photodetector like a photomultiplier or a photodiode which receives only the light within this range of wavelength. Thus, the radiation image information is read out.

The output of the photodetector is amplified and then A/D converted to a digital signal and recorded in a magnetic memory tape. The digital signal memorized in the magnetic memory tape is processed by a processing means like a mini-computer to conduct the gradation processing.

Among the signals representing the original image, the signal corresponding to the lungs 1 has the highest level excluding the area outside the object human body, and the signals for the spine 3 and the heart 2 have the lowest level. Therefore, by obtaining the minimum value Smin of the signal for the spine 3 and the maximum value Smax of the signal for the lungs 1 and performing the signal conversion only on the signals having a level between these values, it is possible to conduct the gradation processing on the necessary image to obtain a radiation image having high diagnostic efficiency and accuracy.

In the present invention, the level S1 of the density between the densities of the spine 3 and the heart 2 is lowered to lower the contrast of the spine 3 and raise the contrast of the heart 2 and the lungs. By lowering the level S1 of the density between the densities of the spine 3 and the heart 2, the diagnostic efficiency and accuracy are enhanced. Further, in another aspect of the present invention, the level S2 of the density between the densities of the heart 2 and the lungs 1 is also lowered together with the level S1 to lower the contrast of the spine 3 and raise only the contrast of the lungs 1.

Figure 3:
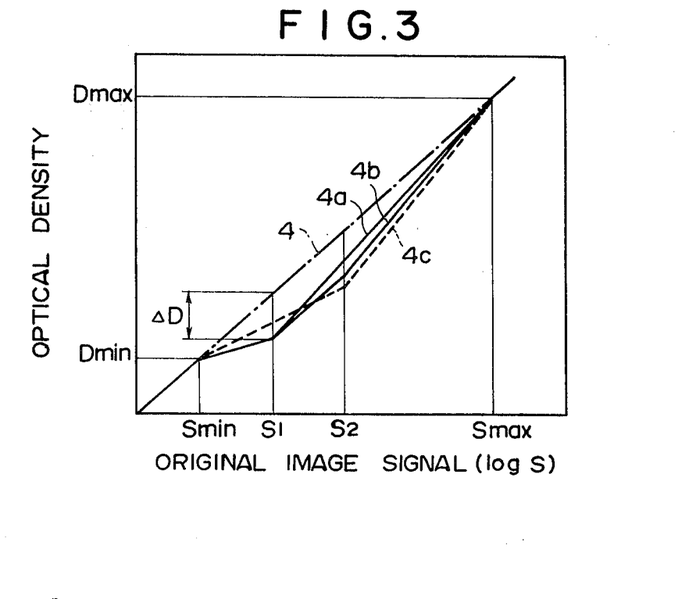
FIG. 3 is a graph showing some embodiments of the gradation processing in accordance with the present invention.

FIG. 3 is a graph showing the gradation processing, in which the chain line 4 represents a linear signal conversion shown by a straight line extending between the maximum density point at the maximum value of the original signal Smax and the minimum density point at the minimum value of the original signal Smin. The signal S is represented in a logarithmic scale.

It should be understood here that the photographic film used for recording the final radiation image does not usually have such a linear characteristic, and accordingly, in order to effect such a linear signal conversion on the photographic film it is necessary to perform a well known "gamma correction." Therefore, it should be noted that the gamma correction should be performed together with the gradation processing. In the description hereinbelow, the description will be made only with respect to the gradation processing on the assumption that the signals are to be subjected, if necessary, to the gamma correction.

Referring now back to FIG. 3, the solid line 4a shows an example of the signal processing conducted in accordance with the present invention. The signal level corresponding to the density between the densities of the spine 3 and the heart 2 is indicated with the reference character S1 and the lowered density from the original level at the density level S1 is indicated with ΔD. In the embodiment as shown in FIG. 3, the degree of lowering the density is made maximum at the density level S1. Therefore, the contrast of the spine 3 within the signal range between Smin and S1 is lowered, and the contrast of the heart 2 and the lungs 1 within the signal range between S1 and Smax is raised as shown by the gradient of the curve 4a in FIG. 3.

The maximum density Dmax and the minimum density Dmin on the final image recorded on the film or the like are somewhat changed by the contrast of the object, the conditions of observation and the ratio of Smin to Smax for example. In general, however, the minimum density Dmin is preferred to be equal to the fog density to the fog density +0.3, more preferably to the fog density +0.2 represented by the optical density and the maximum density Dmax is preferred to be within the range of about 1.5 to 2.8, more preferably 1.8 to 2.6.

The preferred degree of lowering of the density at the density level S1 depends upon the observer who conducts the diagnosis based on the radiation image recorded on the film and also upon the characteristics of the radiation image itself such as the difference in density between the spine and the heart. In general, when the degree of lowering of the density ΔD is small, the gradation change is small, and, therefore, improvement of diagnostic efficiency and accuracy is too small. When ΔD is too large, the contrast of the spine is too much lowered and the diagnostic efficiency and accuracy in the spine are lowered. As a result of tests, it was proved that the diagnostic efficiency and accuracy were improved when ΔD was within the range of 0.1 to 0.5.

The solid line 4b in FIG. 3 shows the curve representing the signal processing in accordance with another aspect of the present invention in which the level S2 of the density between the heart 2 and the lungs 1 is also lowered by the same degree as said degree ΔD from the level of the linear signal conversion indicated with the chain line 4.

By this processing of the gradation, the contrast of the spine 3 within the signal range between Smin and S1 is lowered, the contrast of the heart 2 within the signal range between S1 and S2 is not changed, and the contrast of the lungs 1 within the signal range between S2 and Smax is raised. As a result of tests, it was proved that in this process also the diagnostic efficiency and accuracy were improved when ΔD was within the range of 0.1 to 0.5. Further, it was also proved that the diagnostic efficiency and accuracy was more improved in this case (curve 4b) than the case (curve 4a) in which the density was lowered only around one density level S1.

In FIG. 3, a curve of the signal processing in accordance with the aforementioned U.S. patent application No. 106,733 is also shown. This is shown in a broken line 4c, in which only the density at the level S2 between the heart 2 and the lungs 1 is lowered. According to the tests conducted by the inventors of this invention, the diagnostic efficiency and accuracy was higher in the case of the curves 4a and 4b than in the case of the curve 4c.

Figure 4:
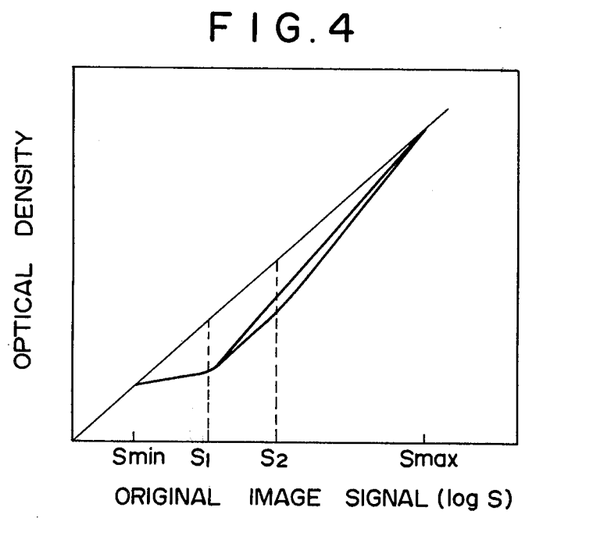
FIGS. 4 and 5 are graphs showing other embodiments of the gradation processing in accordance with the present invention.
Figure 5:
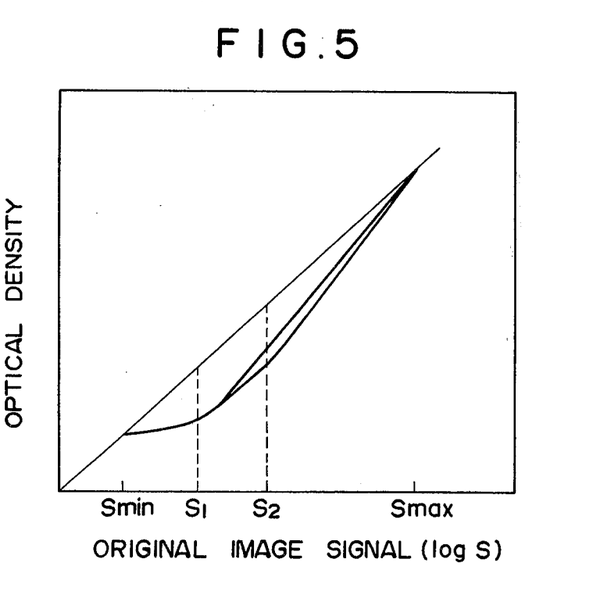

In the embodiment shown in FIG. 3, since the gradation variation is made discontinuous at the density levels S1 and S2. Therefore, the variation in density is also made discontinuous at the density levels S1 and S2 and the image appears unnatural because of the discontinuity. Accordingly, it is desirable that the variation of the density be made continuous or smooth at the density levels S1 and S2 as shown in FIGS. 4 and 5. In FIG. 4, the angled points at the density levels S1 and S2 are rounded. In FIG. 5, the whole curve is changed continuously. With these embodiments as shown in FIGS. 4 and 5, the gradation variation is made smooth and natural.

The results were evaluated by four radiologists since it was impossible to evaluate the diagnostic efficiency and accuracy by the objective physical evaluation by use of sharpness, contrast and granularity.

The standard evaluation was as follows.

+2: The diagnostic efficiency and accuracy were greatly enhanced and improved. For instance, the diseased portions which were not recognized in the conventional radiograph have become recognizable, or the diseased portions which were very difficult to recognize have become clearly recognizable.

+1: The diagnostic efficiency and accuracy were improved. For instance, the diseased portions which were difficult to recognize have become recognizable.

0: The diagnostic efficiency and accuracy were not so improved, though the image has become somewhat clearer.

−1: The diagnostic efficiency and accuracy were lowered in some parts even though they were somewhat improved in other parts.

−2: The diagnostic efficiency and accuracy were lowered with no parts where they were improved.

Figure 6:
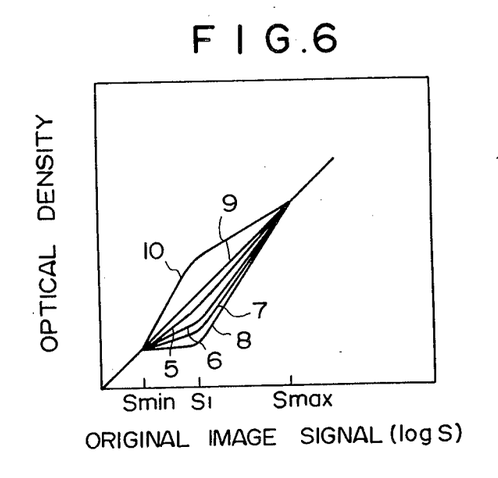
FIG. 6 shows various embodiments of the gradation processing in accordance with the present invention and some examples of the gradation processing which are not included in the present invention.

Under the above standard, original images of ten samples of chest radiograph including the normal pattern, cancer pattern, pneumonia pattern and so forth which were subjected to the gradation processing of various types as shown in FIG. 6 were presented to four radiologists and the diagnostic efficiency and accuracy were evaluated for these samples. In FIG. 6, the curves 5, 6, 7 and 8 are examples of the gradation processing in which the density at the boundary between the spine and the heart were lowered by 0.05, 0.1, 0.5 and 0.6, respectively. The curve 9 represents the density variation without any gradation processing, and curve 10 shows an example of the gradation processing made in the opposite direction, i.e. the density at the boundary level S1 was increased. (ΔD=−0.3)

The results of the evaluation are shown in Table 1.

TABLE 1

| Curve No. | Density Lowered at | by | General Evaluation (Average) |
|---|---|---|---|
| 4a | S1 | 0.3 | +1.8 |
| 4b | S1,S2 | 0.3 | +1.9 |
| 4c | S2 | 0.35 | +1.4 |
| 4,9 | — | 0 | *+0.1 |
| 5 | S1 | 0.05 | +0.5 |
| 6 | S1 | 0.1 | +1.1 |
| 7 | S1 | 0.5 | +1.0 |
| 8 | S1 | 0.6 | **−1.0 |
| 10 | S1 | −0.3 | −1.9 |

*Since Smax and Smin were properly controlled, the diagnostic efficiency and accuracy was a little improved even without lowering the density.
**The diagnostic efficiency and accuracy was a little lowered at the portion of the spine.

According to the tests conducted by the present inventors, the degree of lowering ΔD of the density at the boundary levels S1 and S2 was within the range of 0.1 to 0.5 in order to effectively enhance the diagnostic efficiency and accuracy.

Figure 7:
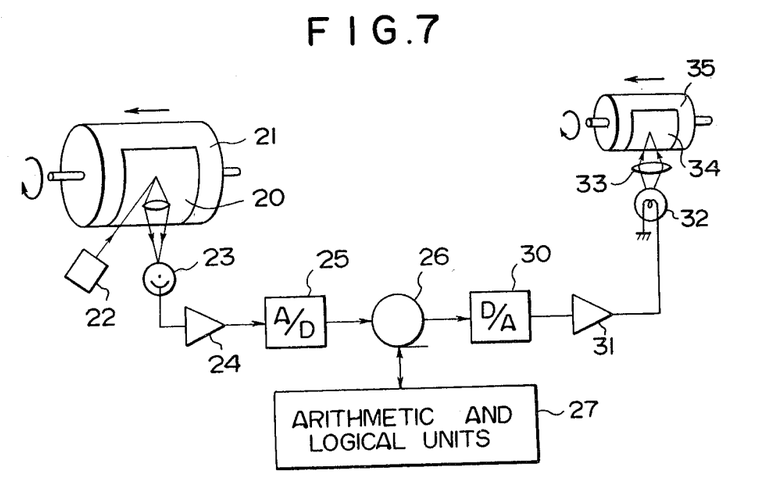
FIG. 7 is a block diagram of a radiation image recording system in which the image processing apparatus of the present invention is employed.

FIG. 7 is a block diagram showing the outline of the radiation image recording system in which the method and apparatus of this invention are embodied. A stimulable phosphor plate 20 on which the X-ray image is recorded by exposing the chest to an X-ray is mounted on a drum 21. The drum 21 is moved in the axial direction as well as rotated about its axis so that the phosphor plate 20 is exposed to a light beam from a read-out light source 22 which is located outside the drum 21. Thus, the light beam scans the phosphor plate 20 in the two dimensional scanning mode. As for the light source 22 is used a He-Ne laser source.

The light emitted from the stimulable phosphor plate 20 upon stimulation by the scanning light beam from the light source 22 is received by a photodetector 23 and converted to an electric signal, which is amplified by an amplifier 24 and converted to a digital signal through an A/D converter 25. The digital signal thus obtained is memorized in a magnetic memory tape 26. The date memorized in the magnetic memory tape 26 is input into arithmetic and logical units or processor 27 like a computer, wherein the Smin, S1, S2 and Smin of the original image signal are analyzed.

Figure 8:
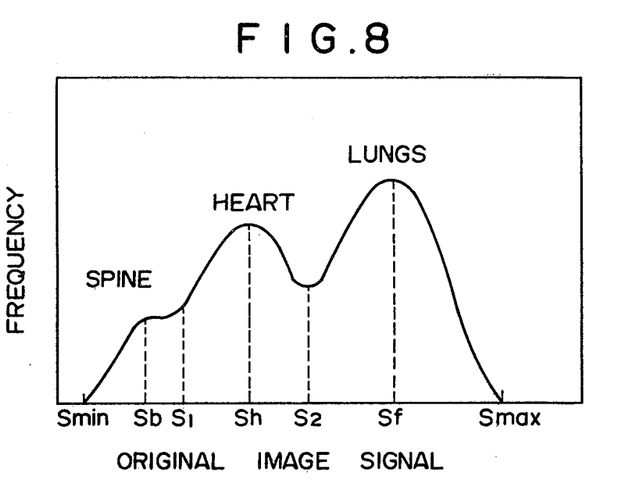
FIGS. 8 and 9 are histograms of the densities respectively of the heart and the lungs.

In the normal original image of a chest, a histogram as shown in FIG. 8 can be obtained for the whole chest image. In the histogram shown in FIG. 8, the signal for the area outside the object is not included. This histogram has three peaks the lowest one representing the frequency distribution for the spine, the central one representing that of the heart and the highest one representing that of the lungs. The height of the three peaks and the width thereof are different depending upon the range of the part of the human body for which the histogram was made, the shape of the chest and so on. The minimum and maximum values Smin and Smax are calculated as the points where the frequency of the histogram falls to zero or a predetermined small value, e.g. 5% of the maximum frequency. The levels S1 and S2 corresponding to the densities between the densities of the spine and the heart, and between the densities of the heart and the lungs can be determined as the levels of the signal at the bottom of the valleys of the histogram between the three peaks as shown in FIG. 8 or as the average value of the adjacent two signals Sb and Sh, and Sh and Sf, i.e. (Sb+Sh)/2 and (Sh+Sf)/2.

Figure 9:
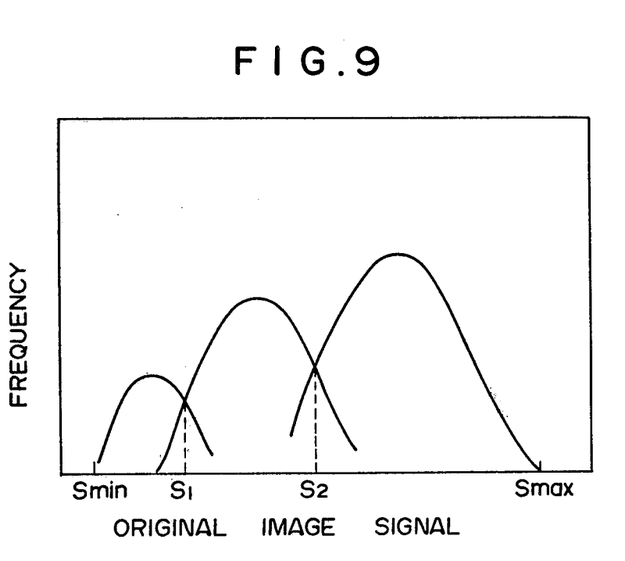

When three histograms are separately made for the spine, heart and lungs as shown in FIG. 9, the levels S1 and S2 can be determined as the average value of the adjacent two peaks, i.e. (Sb+Sh)/2 and (Sh+Sf)/2, or as the level of the signal at the crossing point of the adjacent two histograms. It will be mentioned hereinafter how to designate the spine, heart and the lungs in the image.

In view of the simplicity of calculation, the above mentioned methods of determining the levels S1 and S2 are advantageous in practice, though there are various other methods possible for determining the levels S1 and S2. Though it is practically very difficult to obtain the true levels S1 and S2 from the histogram, it has been confirmed that favorable results were obtained even with the above-mentioned approximate value of the levels S1 and S2.

The designation of the spine, heart and the lungs can be conducted as follows.

The first method is a statistical method in which said levels are statistically presumed from a number of radiation images. This method is able to obtain sufficiently accurate levels for practical use by making a proper compensation for the characteristics of the human body to be the object of the radiation image as desired.

The second method is a direct searching method in which the instantaneous light emission observed at the time of the initial image recording step for recording the radiation image in the stimulable phosphor is utilized for searching the position of the boundaries between the spine and the heart and between the heart and the lungs. In other words, as proposed in Japanese patent application No. 53(1978)-122882 filed by the same applicant, the instantaneous emission of light upon exposure of the stimulable phosphor to the recording radiation is detected to confirm the position of the boundary by making the histogram as shown in FIG. 9. By making the histogram as shown in FIG. 9, it is possible to know the levels S1 and S2 as the level at the crossing point of the adjacent two histograms or to calculate the levels S1 and S2 as the average values of the adjacent two peaks of the histograms (Sb+Sh)/2 and Sh+Sf)/2 as mentioned hereinbefore.

After these values, Smin, S1, S2 and Smax, have been obtained, the data recorded in the magnetic memory tape 26 are processed to perform the signal conversion of gradation processing as shown in FIGS. 3 to 6 so that the radiograph may be reproduced on the final recording medium in the desirable gradation. The processed data are returned to the magnetic memory tape 26 for memorization of the data after processing. The operation of the signals can also be performed in the form of analog signals. Or it can be performed in real time in either digital form or analog form without using memory such as magnetic tapes. Further, the signal processing may include the process for compensation for the gradation of the final recording medium such as a photographic film. Furthermore, an unsharp masking process and/or a frequency filtering can be conducted to control the sharpness of the image.

The gradation processed data are read out from the magnetic memory tape 26, converted to an analog signal by a D/A converter 30 and input into a recording light source 32 after amplified by an amplifier 31.

The light emitted from the light source 32 is focused on a photographic film 34 by means of a lens 33 to record an image thereon. The photographic film 34 is mounted on a recording drum 35 which is rotated and axially moved for causing the photographic film mounted thereon to be exposed to the light from the light source 32 in a two dimensional scanning mode so that a radiation image is recorded on the photographic film 34 in the gradation processed form.

As for the photographic film 34 can be used a photosensitive material like a silver halide photographic film, diazo film, electrophotographic material and so forth. Further, it is possible to display the image on a monitor like a CRT instead of recording the image on a photosensitive material.

We claim:

1. A method of gradation processing a chest radiation image in a radiation image recording system in which a stimulable phosphor is scanned with a stimulating ray and the chest radiation image information recorded therein is read out and converted into an electric signal upon stimulation thereof and then a visible image is recorded on a recording medium by use of the electric signal, said method comprising lowering the level of the electric signal corresponding to the density between the densities of the spine and the heart of the chest radiation image to lower the density of the image at the level between the density of the spine and the density of the heart, whereby the contrast of the spine is lowered and the contrast of the heart and the lungs is raised in the image recorded on the recording medium.

2. A method of gradation processing a chest radiation image in a radiation image recording system as defined in claim 1 wherein said level of the electric signal is lowered by the level of 0.1 to 0.5 in terms of optical density of the recording medium.

3. A method of gradation processing a chest radiation image in a radiation image recording system as defined in claim 1 wherein the level of the electric signal is generally lowered in the density range between the minimum density of the spine and the maximum density of the lungs, and the level of the electric signal corresponding to the density between the densities of the spine and the heart is lowered to the most extent in said density range, the degree of lowering being monotonously increased from the minimum density of the spine to said density between the densities of the spine and the heart and being monotonously decreased from said density between the densities of the spine and heart to the maximum density of the lungs.

4. A method as in claim 3 where the level of the electrical signal changes smoothly as it passes through the level corresponding to said density between the densities of the spine and the heart.

5. A method of gradation processing a chest radiation image in a radiation image recording system as defined in claim 1 wherein the level of the electric signal continuously changes in the density range between the minimum density of the spine and the maximum density of the lungs so that the level of the electric signal corresponding to the density between the densities of the spine and the heart is lowered to the most extent in said density range and the degree of lowering is continuously increased from the minimum density of the spine to said density between the densities of the spine and the heart and continuously decreased from said density between the densities of the spine and heart to the maximum density of the lungs.

6. A method of gradation processing a chest radiation image in a radiation image recording system in which a stimulable phosphor is scanned with a stimulating ray and the chest radiation image information recorded therein is read out and converted into an electric signal upon stimulation thereof and then a visible image is recorded on a recording medium by use of the electric signal, said method comprising lowering the level of the electric signals corresponding to the density between the densities of the spine and the heart and the density between the densities of the heart and the lungs of the chest image to lower the density of the image in the area of the heart, whereby the contrast of the spine is lowered and the contrast of the lungs is raised in the image recorded on the recording medium.

7. A method of gradation processing a chest radiation image in a radiation image recording system as defined in claim 6 wherein said level of the electric signal is lowered by the level of 0.1 to 0.5 in terms of optical density of the recording medium.

8. A method of gradation processing a chest radiation image in a radiation image recording system as defined in claim 6 wherein the level of the electric signal is generally lowered in the density range between the minimum density of the spine and the maximum density of the lungs, and the levels of the electric signals corresponding to (a) the density between the densities of the spine and the heart and (b) the density between the densities of the heart and the lungs are lowered to the most extent in said density range, the degree of lowering being monotonously increased from the minimum density of the spine to said density between the densities of the spine and the heart and being monotonously decreased from said density between the densities of the heart and the lungs to the maximum density of the lungs.

9. A method as in claim 8 where the level of the electrical signal changes smoothly as it passes through (a) the level corresponding to said density between the densities of the spine and the heart and (b) the level corresponding to said density between the densities of the heart and the lungs.

10. A method of gradation processing a chest radiation image in a radiation image recording system as defined in claim 6 wherein the level of the electric signal continuously changes in the density range between the minimum density of the spine and the maximum density of the lungs, so that (1) the levels of the electric signals in the density range between (a) the density between the densities of the spine and the heart and (b) the density between the densities of the heart and the lungs are lowered to a greatest extent and (2) the degree of lowering is continuously increased from the minimum density of the spine to said density between the densities of the spine and the heart and continuously decreased from said density between the densities of the heart and the lungs to the maximum density of the lungs.

11. A method of gradation processing a chest radiation image in a radiation image recording system as defined in claim 6 wherein the level of the electric signal changes at least in a portion of the density range between the minimum density of the spine and the maximum density of the lungs, so that (1) the levels of the electric signals in the density range between (a) the density between the densities of the spine and the heart and (b) the density between the densities of the heart and the lungs are lowered to a greatest extent and (2) the degree of lowering is continuously increased from the minimum density of the spine to said density between the densities of the spine and the heart and continuously decreased from said density between the densities of the heart and the lungs to the maximum density of the lungs, the level of the electrical signal changing smoothly as it passes through (a) the level corresponding to said density between the densities of the spine and the heart and (b) the level corresponding to said density between the densities of the heart and the lungs.

12. An apparatus for performing gradation processing of a chest radiation image in a radiation image recording system in which a stimulable phosphor is scanned with a stimulating ray and the chest radiation image information recorded therein is read out and converted into an electric signal upon stimulation thereof and then a visible image is recorded on a recording medium by use of the electric signal, said gradation processing apparatus comprising means for determining a signal level corresponding to the density between the densities of the spine and the heart of the chest radiation image, means for detecting the substantial maximum and minimum values of said electric signal respectively corresponding to the maximum density of the lungs and the minimum density of the spine, means for lowering the level of said signal level corresponding to said density between said densities and means for determining the level of said maximum and minimum values whereby the contrast of the spine is lowered and the contrast of at least the lungs is raised in the image recorded on the recording medium.

13. Apparatus as defined in claim 12 including means for continuously changing the level of the electric signal in the density range between the minimum density of the spine and the maximum density of the lungs, so that (1) the levels of the electric signals in the density range between (a) the density between the densities of the spine and the heart and (b) the density between the densities of the heart and the lungs are lowered to a greatest extent and (2) the degree of lowering is continuously increased from the minimum density of the spine to said density between the densities of the spine and the heart and continuously decreased from said density between the densities of the heart and the lungs to the maximum density of the lungs.

* * * * *